United States Patent
So et al.

(10) Patent No.: US 8,504,086 B2
(45) Date of Patent: Aug. 6, 2013

(54) METHOD AND APPARATUS FOR ALLOCATING PHYSICAL CELL IDENTIFIER IN WIRELESS COMMUNICATION SYSTEM

(75) Inventors: Jung-Min So, Seoul (KR); Hee-Jung Byun, Anyang-si (KR); Bong-Jhin Shin, Seoul (KR); Ga-Hee Lee, Seoul (KR); Dae-Hyoung Hong, Seoul (KR); Mi-Sun Do, Suwon-si (KR); Hyon-Goo Kang, Suwon-si (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 121 days.

(21) Appl. No.: 12/924,865

(22) Filed: Oct. 7, 2010

(65) Prior Publication Data

US 2011/0086652 A1    Apr. 14, 2011

(30) Foreign Application Priority Data

Oct. 9, 2009 (KR) .......................... 10-2009-0095946

(51) Int. Cl.
*H04B 15/00* (2006.01)

(52) U.S. Cl.
USPC ........... 455/509; 455/501; 455/450; 455/411; 455/436; 455/507

(58) Field of Classification Search
USPC .................. 455/501, 509, 450, 411, 436, 507
See application file for complete search history.

(56) References Cited

U.S. PATENT DOCUMENTS

| | | | | |
|---|---|---|---|---|
| 2010/0002603 | A1* | 1/2010 | Gupta et al. | 370/254 |
| 2010/0020710 | A1* | 1/2010 | Gupta et al. | 370/252 |
| 2010/0178912 | A1* | 7/2010 | Gunnarsson et al. | 455/423 |

* cited by examiner

*Primary Examiner* — Barry Taylor

(57) ABSTRACT

A method and apparatus allocates a Physical Cell Identifier (PCID) in a wireless communication system by considering a PCID reuse factor. An allowable PCID list is acquired from a server. A set of candidate PCIDs is determined from the allowable PCID list according to PCID allocation conditions. A received signal strength of each cell using the determined set of candidate PCID is determined. At least one PCID is selected by using a PCID reuse factor and the received signal strength of each of the cells using the determined set of candidate PCIDs.

16 Claims, 8 Drawing Sheets

METHOD AND APPARATUS FOR ALLOCATING PHYSICAL CELL IDENTIFIER IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119 to an application filed in the Korean Intellectual Property Office on Oct. 9, 2009 and assigned Ser. No. 10-2009-0095946, the contents of which are incorporated herein by reference.

TECHNICAL FIELD OF THE INVENTION

The present invention relates to a method and apparatus for allocating a Physical Cell Identifier (PCID) in a wireless communication system and, in particular, to an apparatus and method for selecting a PCID to be allocated to a new cell in consideration of a PCID reuse factor, after collecting received (RX) signals of cells using candidate PCIDs.

BACKGROUND OF THE INVENTION

An automatic Physical Cell Identifier (PCID) allocation scheme for configuring a Self-Organization Network (SON) in a 3rd Generation Partnership Project (3GPP) Long Term Evolution (LTE) system is under development. In the automatic PCID allocation scheme, a new Evolved Universal Terrestrial Radio Access Network (E-UTRAN) Node-B (eNB, also referred to as a base station (BS)) collects neighbor cell information to select a PCID to be allocated to its own cell. In the LTE system, various cells may be freely established/removed by users. Also, the cell establishment requires a complicated cell driving process using many initial configuration parameters. A scheme is needed in which the eNB automatically determines the initial configuration parameters in such SON environments without the help of an operator. In particular, a scheme is needed that allocates a PCID used by a physical layer for cell identification, among the initial configuration parameters of a new cell. In the LTE system, a plurality of cells reuse five hundred four ('504') PCIDs.

Meanwhile, the eNB should consider collision-free conditions and confusion-free conditions for PCID allocation.

FIGS. 1A and 1B illustrate collision-free conditions and confusion-free conditions for Physical Cell Identifier (PCID) allocation.

Referring to FIG. 1A, a collision may occur when cells 100 and 102 neighboring each other (hereinafter also referred to as neighbor cells) use the same PCID to interfere with each other. When the collision occurs, a user terminal 104 cannot discriminate between the cells 100 and 102 and thus experiences difficulty in communicating with the cells 100 and 102. Thus, the collision-free conditions are to restrict the use of the same PCID by the neighbor cells.

Referring to FIG. 1B, cells 110 and 112 use different PCIDs A and B and do not interfere with each other. However, when a cell 114 neighboring the cell 112 uses the same PCID A as the cell 110, a user terminal in the cell 112 may have encounter confusion as to which of the cells 110 and 114 it has to be handed over.

That is, a handover problem may occur when different cells neighboring a common cell use the same PCID. Thus, the confusion-free conditions are to restrict the use of the same PCID by the different cells neighboring the cell.

PCID allocation for an eNB is performed in two stages. First, a candidate PCID list capable of preventing collision/confusion is determined. A new cell may remove a collision/confusion causing PCID from an available PCID list to make the candidate PCID list. Thereafter, the eNB randomly selects a PCID from the candidate PCID list and allocates the selected PCID to the new cell.

Such a random PCID selection method has low complexity. However, the random PCID selection method cannot achieve a system performance gain because PCIDs are randomly allocated to cells.

For example, a WCDMA system allocates a scrambling code. Thus, a scrambling code planning is performed for the efficient use of limited scrambling codes.

In other words, in a CDMA system, because an operator knows coverage information such as antenna patterns and locations of cells to be installed in a cell planning stage, a user may determine a distance between cells capable of using the same scrambling code (i.e., a code reuse distance), in consideration of a cell coverage and a path loss. A code reuse pattern satisfying the determined code reuse distance is predefined in the cell planning stage to allocate a scrambling code to each cell. This method is efficient because a system operation is possible by the available minimum code number when the code reuse distance is determined.

However, a code reuse pattern is difficult to use in the LTE SON environments because cells of various coverages are occasionally established and removed at random locations.

What is therefore needed is a method and apparatus for efficiently allocating a PCID in a wireless communication system by using a code reuse pattern.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an object of the present invention is to provide a method and apparatus for allocating a Physical Cell Identifier (PCID) in a wireless communication system.

Another object of the present invention is to provide a method and apparatus for efficiently allocating a PCID in a wireless communication system by using a code reuse pattern.

Another object of the present invention is to provide a method and apparatus for minimizing the number of PCIDs required in an SON (Self-Organization Network) network.

Another object of the present invention is to provide a method and apparatus for controlling the interference from a cell using the same PCID in an SON network by using a PCID reuse factor.

According to an aspect of the present invention, a method for allocating a PCID in a wireless communication system includes acquiring an allowable PCID list from a server. At least one candidate PCID is determined from the allowable PCID list according to PCID allocation conditions. A signal strength is measured for each signal received from each of the cells using the determined candidate PCID. And at least one PCID is selected by using a PCID reuse factor and the received signal strength of each of the cells using the determined candidate PCID.

According to another aspect of the present invention, a method for allocating a PCID in a wireless communication system includes determining an allowable PCID list and a PCID reuse factor. The allowable PCID list and the PCID reuse factor is provided to a corresponding BS.

According to another aspect of the present invention, an apparatus for allocating a PCID in a wireless communication system includes a control unit for acquiring an allowable PCID list from a server and determining at least one candidate PCID from the allowable PCID list according to PCID allocation conditions. A transmitting/receiving unit measures a received signal strength of each of cells using the determined candidate PCID. A PCID selecting unit selects at least one PCID by using a PCID reuse factor and the received signal strength of each of the cells using the determined candidate PCID.

According to another aspect of the present invention, an apparatus for allocating a PCID in a wireless communication system includes a control unit for determining an allowable PCID list and a PCID reuse factor and providing the allowable PCID list and the PCID reuse factor to a corresponding BS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of certain embodiments of the present invention will be more apparent from the following description taken in conjunction with the accompanying drawings in which.

DETAILED DESCRIPTION OF THE INVENTION

FIGS. 2A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Embodiments of the present invention will be described herein below with reference to the accompanying drawings. In the following description, well-known functions or constructions are not described in detail as they would obscure the invention in unnecessary detail. Terminologies described below are defined with consideration of functions in the present invention, and may change based upon preferences or practice of a user or operator. Therefore, the definitions should be determined on the basis of the descriptions in the specification.

The present invention provides a method and apparatus for allocating a Physical Cell Identifier (PCID) in a wireless communication system. Embodiments of the present invention provide a scheme for allocating a PCID to a cell of a new eNB (BS) by using a PCID reuse factor and signal strength information of a neighboring cell collected by the eNB (BS) in a Self-Organization Network (SON) system.

In the scrambling code planning, the number of available codes is determined according to a code reuse distance. For example, if the code reuse efficiency is the ratio of the number of codes required for the same number of cells, the code reuse efficiency is higher for a short code reuse distance than for a long code reuse distance. A code reuse pattern is difficult to use in the SON system because cells are generated/removed at random locations. However, if PCIDs are allocated with some regularity between cells using the same PCID, it may increase the PCID reuse efficiency in the SON system.

In order to improve the PCID reuse efficiency, the present invention provides a scheme in which a new cell collects a received signal strength value from a cell using each candidate PCID and uses the received signal strength value to select one PCID. In other words, because the received signal strength value is inversely proportional to the path loss, the distance between cells using the same PCID may be shortened by allocating the PCID of the cell with a large received signal strength value to the new cell. Therefore, the PCID reuse efficiency may be increased by increasing the PCID reuse frequency. On the other hand, the PCID reuse efficiency may be reduced by selecting the PCID of the cell with a small received signal strength value.

Figure 1A:
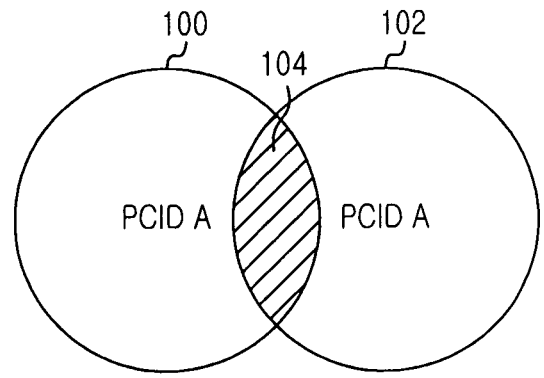
FIGS. 1A and 1B illustrates collision-free conditions and confusion-free conditions for Physical Cell Identifier (PCID) allocation.
Figure 1B:
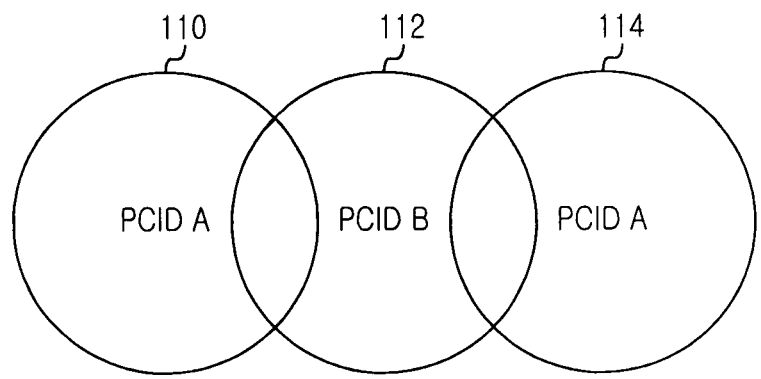
Figure 2A:
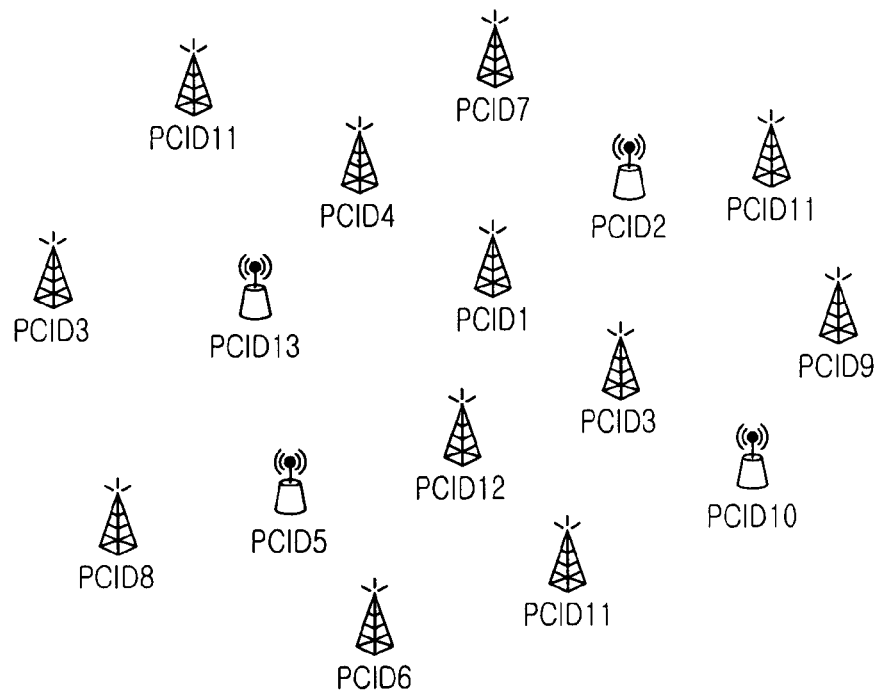
FIGS. 2A and 2B illustrate examples of PCID allocation according to a method for selecting one of candidate PCIDs.
Figure 2B:
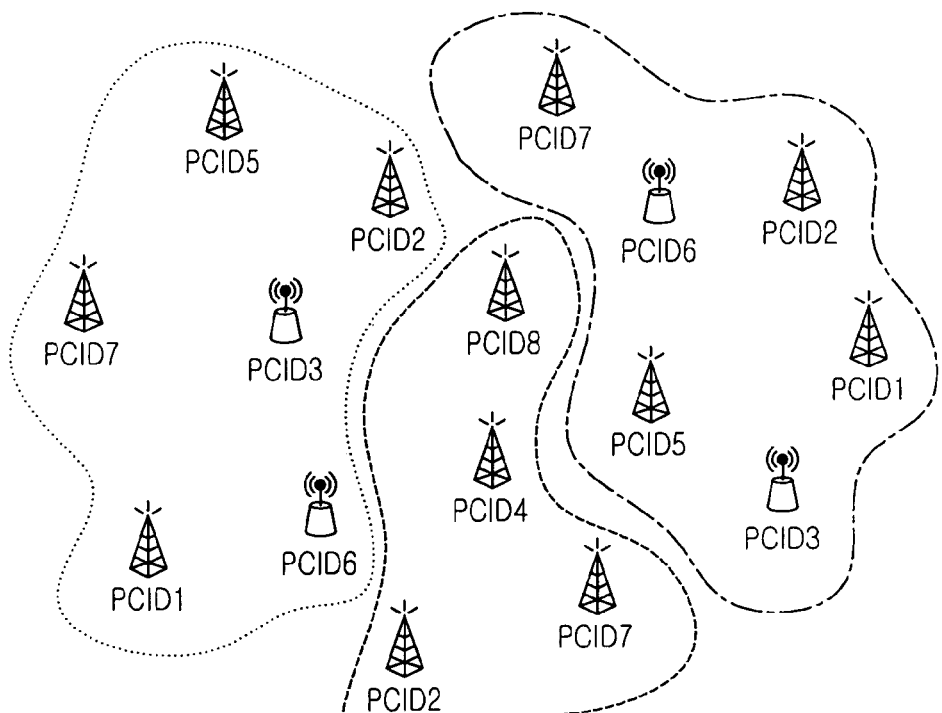

FIGS. 2A and 2B illustrate examples of PCID allocation according to a method for selecting one of several candidate PCIDs.

FIG. 2A illustrates an example in which a PCID is randomly selected from a candidate PCID list. In this example, a specific PCID may be selected frequently or rarely. For example, a PCID 3 or a PCID 11 may be selected more frequently than other PCIDs, and PCIDs 1, 2, 4 to 10 and 12 may be selected once. Also, when a PCID is randomly selected, because the adjacent cells may simultaneously select the same PCID, it may fail to satisfy collision-free conditions or confusion-free conditions.

FIG. 2B illustrates an example in which a PCID is selected using a received signal strength. In this situation, due to the SON environments, a specific PCID reuse pattern does not appear, but the PCID reuse efficiency may be controlled to create a group including the specific PCID.

Figure 3:
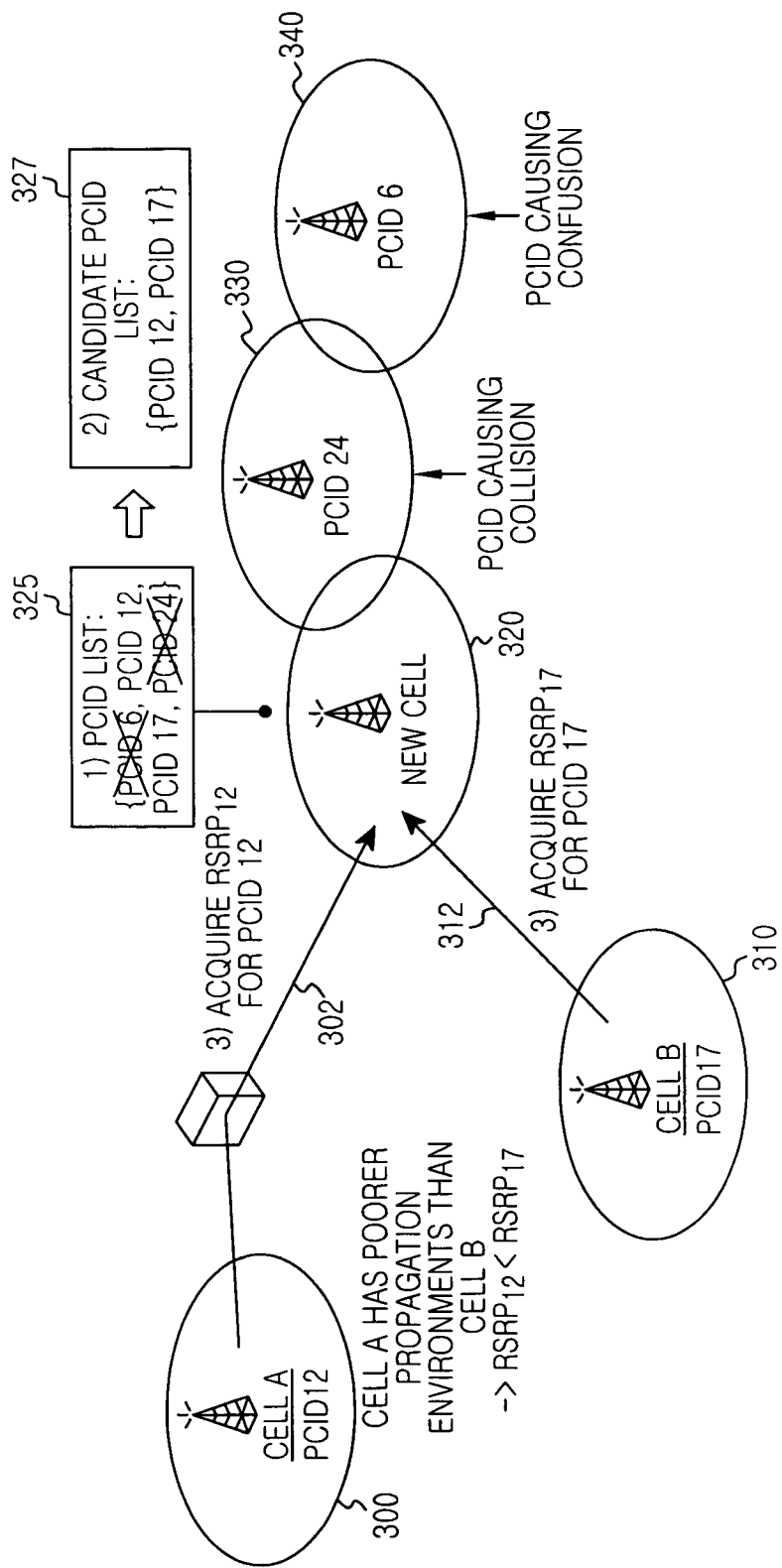
FIG. 3 illustrates an example of using a received signal strength to allocate a PCID to a new cell generated in a wireless communication system according to an embodiment of the present invention.

FIG. 3 illustrates an example of using a received signal strength to allocate a PCID to a new cell generated in a wireless communication system according to an embodiment of the present invention.

Referring to FIG. 3, in an environment where a cell A 300 using a PCID 12, a cell B 310 using a PCID 17, a cell 330 using a PCID 24 and a cell 340 using a PCID 6 are already operated, when a new cell 320 is generated, a new PCID should be allocated to the new cell 320.

To this end, an eNB of the new cell 320 receives an allowable PCID list (PCID 6, PCID 12, PCID 17, PCID 24) from an Operation & Management (OAM) server, collects information about neighbor cells (i.e., the cell 330 using the PCID 24 and the cell 340 using the PCID 6), removes the PCID causing a collision/confusion from the PCID list to determine a candidate PCID list. For example, because the PCID 24 of the cell 330 causes a collision and the PCID 6 of the cell 340 causes a confusion, the eNB removes the PCID 6 and the PCID 24 from the PCID list (PCID 6, PCID 12, PCID 17, PCID 24) to determine a candidate PCID list (PCID 12, PCID 17) 327.

The eNB acquires the PCID information causing a collision through the measurement report of a user terminal, or estimates the received signal strengths of the cells according to the respective PCIDs to determine a cell likely to cause interference and to acquire the PCID information of the cell. Also, the eNB may acquire a neighbor cell list (NCL) though an X2 interface to determine the PCID information causing a confusion.

Thereafter, the eNB collects the received signal strength value of the cell 300/310 using each PCID included in the candidate PCID list 327. In other words, the eNB collects the Reference Signal Received Power (RSRP) information of the cell using each PCID (302, 312). The RSRP represents the received power of a cell-specific downlink reference signal transmitted in every downlink subframe for downlink channel estimation. Because the sequence of the reference signal is determined by the PCID of each cell, the RSRP of the cell using the acquired PCID may be known by acquiring the PCID used by each cell. Thus, the PCID of each cell may be acquired through a synchronization signal broadcast by the cell. An example of this information collection method is eNB scanning.

Collecting the RSRP value for each candidate PCID means acquiring the propagation environments between the new cell and the cell using each candidate PCID. This information may be used to suitably control the PCID reuse efficiency and the interference. In general, the received signal strength is inversely proportional to the path loss and decreases with an increase in the distance. Therefore, using the PCID with a low received signal strength reduces the interference. However, because the distance between the cells using the same PCID increases, the PCID reuse frequency decreases, thus reducing the PCID reuse efficiency. Alternatively, reusing the PCID with a high received signal strength may increase the PCID reuse efficiency. However, the interference may also increase, thus degrading the system performance.

For example, the new cell of FIG. 3 removes the PCIDs 6 and 24 which cause collision/confusion from the PCID list that includes the PCIDs 6, 12, 17 and 24. Also, the cell A 300 using the candidate PCID 12 has poor propagation environments compared to the cell B 310 using the candidate PCID 17. Thus, the RSRP value for the PCID 12 used by the cell A 300 becomes smaller than the RSRP value for the PCID 17 used by the cell B 310. In order to maintain the system performance by reducing the interference between the cells using the same PCID, the new cell 320 selects the PCID 12 used by the cell A 300 of a relatively small RSRP value. Alternatively, in order to increase the reuse efficiency by reducing the distance between the cells using the same PCID, it selects the PCID of a great RSRP value. Hereinafter, a parameter determining the inter-cell interference level and the PCID reuse efficiency will be referred to as a PCID reuse factor.

Figure 4A:
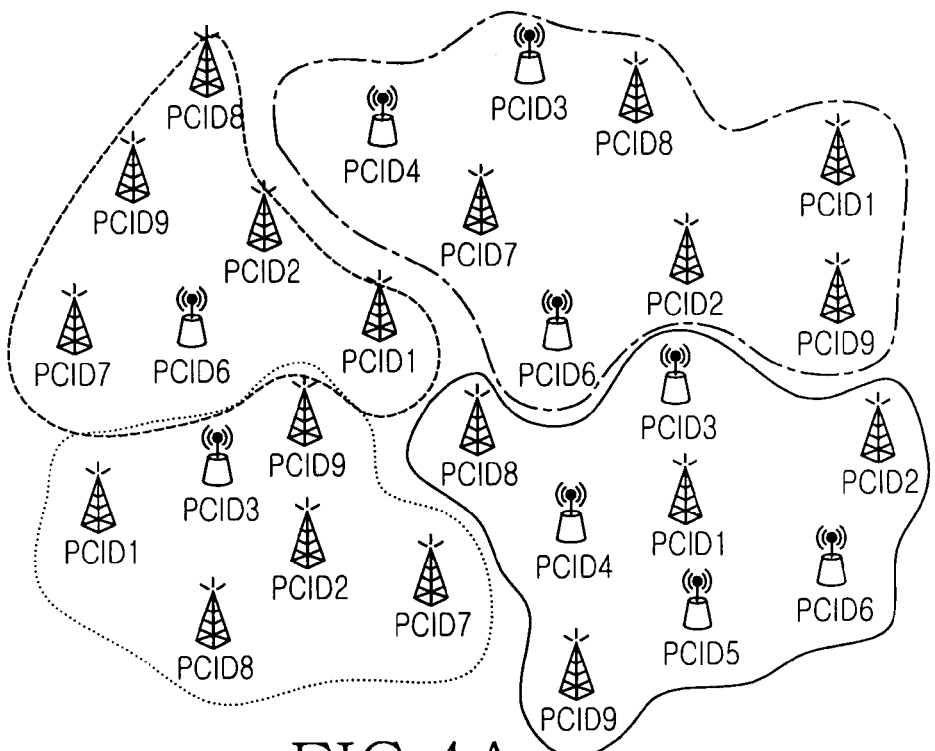
FIGS. 4A and 4B illustrate examples of PCID allocation according to a PCID reuse factor according to embodiments of the present invention.
Figure 4B:
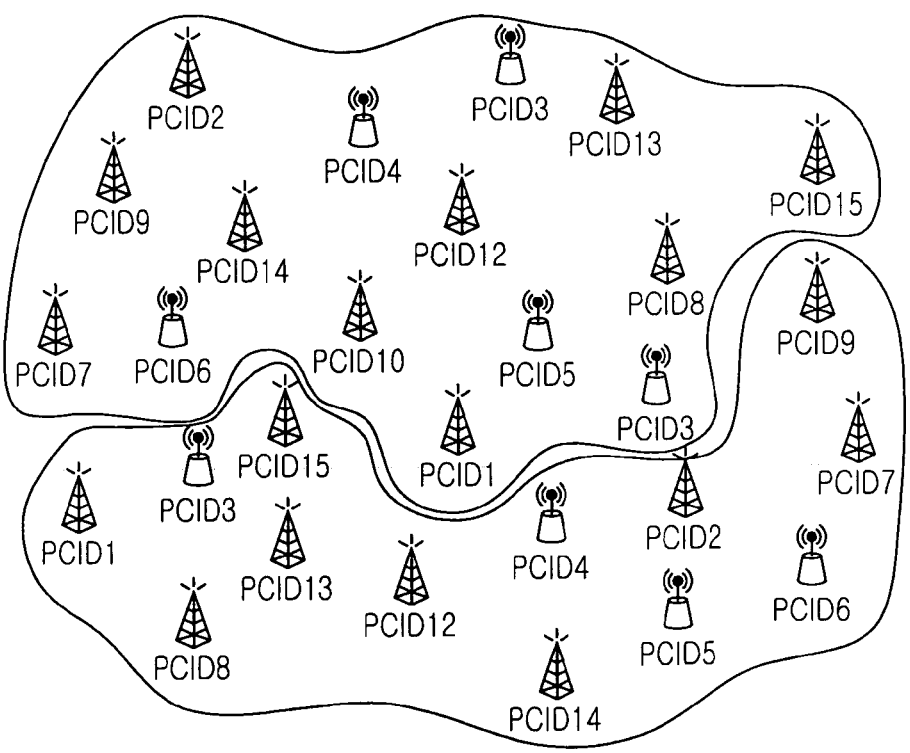

FIGS. 4A and 4B illustrate examples of PCID allocation according to a PCID reuse factor according to the present invention. A PCID reuse factor of FIG. 4A is larger than a PCID reuse factor of FIG. 4B.

Referring to FIG. 4A, because a PCID reuse factor of FIG. 4A is greater than a PCID reuse factor of FIG. 4B, a PCID is allocated within the range from the PCID 1 to the PCID 9 fewer than the PCIDs used in FIG. 4B. However, because the distance between the cells using the same PCID is short, the inter-cell interference may be larger than that of FIG. 4B. If the propagation environments are better than those of FIG. 4B, the inter-cell interference may be similar to that of FIG. 4B even when the distance between the cells using the same PCID is shorter than that of FIG. 4B.

Referring to FIG. 4B, because a PCID reuse factor of FIG. 4B is smaller than a PCID reuse factor of FIG. 4A, a PCID is allocated within the range from the PCID 1 to the PCID 15 more than the PCIDs used in FIG. 4A. However, because the distance between the cells using the same PCID is long, the inter-cell interference may be smaller than that of FIG. 4A. If the propagation environments are not better than those of FIG. 4A, the inter-cell interference may be similar to that of FIG. 4A even when the distance between the cells using the same PCID is longer than that of FIG. 4A.

Figure 5:
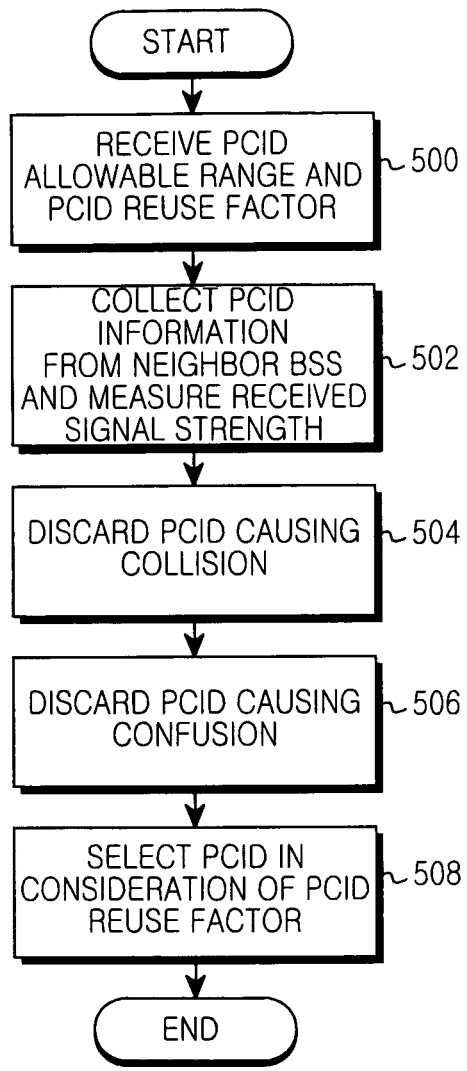
FIG. 5 illustrates a base station (BS) operation for PCID allocation in a wireless communication system according to an embodiment of the present invention.

FIG. 5 illustrates a base station (BS) operation for PCID allocation in a wireless communication system according to an embodiment of the present invention.

Referring to FIG. 5, in block 500, the BS receives information about a PCID reuse factor and a PCID allowable range (or a PCID list) from an OAM server. Herein, the PCID reuse factor is determined by the OAM server in consideration of the cell coverage, the cell population density, the available PCID range, the allowable interference standard, and/or the propagation characteristics of an installed cell.

In block 502, in order to remove a collision-causing PCID and a confusion-causing PCID from the PCID list, the BS collects PCID information from neighbor cells and measures received signal strengths. That is, the BS may use the measurement report of a user terminal or may estimate the received signal strength of the cell using each PCID to determine an interference-causing cell, thereby acquiring collision-causing PCID information. Also, the BS may acquire a Neighbor Cell List (NCL) through an X2 interface with neighbor cells, thereby determining confusion-causing PCID information.

In block 504, the BS removes the collision-causing PCIDs from the PCID list. In block 506, the BS removes the confusion-causing PCIDs from the PCID list. Herein, the collision/confusion-causing PCIDs are removed from the PCID list, thereby determining a candidate PCID list.

In block 508, the BS selects a PCID in consideration of a PCID reuse factor. Herein, a PCID is selected as follows. A new cell acquires RSRP value information about candidate PCIDs included in the candidate PCID list, and then selects a PCID on the basis of Equation (1):

$$RSRP_{sel} = \text{Max}\{RSRP_i | RSRP_{Min} \leq RSRP_i \leq \alpha RSRP_{Max} + (1-\alpha) RSRP_{Min}\} \text{ where } 0 \leq \alpha \leq 1,$$

$$RSRP_{Max} = \text{Max}\{RSRP_i | i \in I\}$$

$$RSRP_{Min} = \text{Min}\{RSRP_i | i \in I\} \qquad \text{[Eqn. 1]}$$

Herein, I denotes a set of candidate PCIDs included in a candidate PCID list, i denotes a PCID among the set of candidate PCIDs, $RSRP_i$ denotes an RSRP value received from a cell using a PCID i, $RSRP_{Max}$ denotes the maximum RSRP value among the RSRP values for all the candidate PCID i, and $RSRP_{Min}$ denotes the minimum RSRP value among the RSRP values for all the candidate PCID i. A PCID with the minimum RSRP value among the RSRP values for the candidate PCID i is allocated when $\alpha=0$; and a PCID with the maximum RSRP value is allocated when $\alpha=1$. Herein, $\alpha$ denotes a PCID reuse factor. The PCID reuse factor may be controlled to control the interference and the PCID reuse efficiency.

Figure 6:
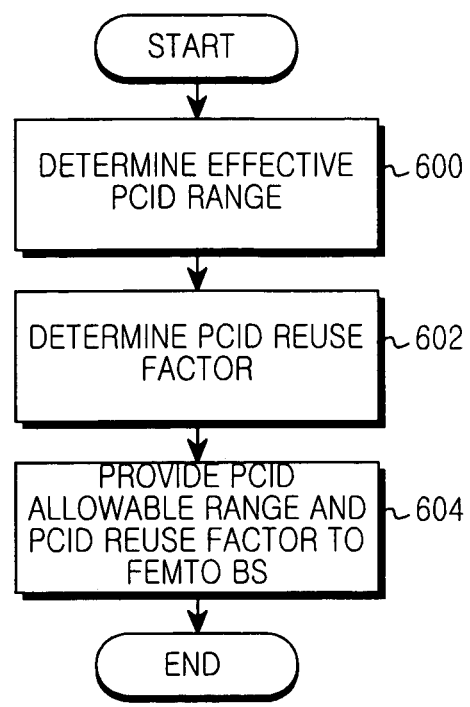
FIG. 6 illustrates an Operation & Management (OAM) server operation for PCID allocation in a wireless communication system according to an embodiment of the present invention.

FIG. 6 illustrates an Operation & Management (OAM) server operation for PCID allocation in a wireless communication system according to an embodiment of the present invention.

Referring to FIG. 6, the OAM server determines an effective PCID range in block 600. In block 602, the OAM server determines a PCID reuse factor. In an embodiment, the PCID reuse factor is determined in consideration of the cell coverage, the cell population density, the available PCID range, the allowable interference standard, and/or the propagation characteristics of an installed cell.

In block 604, the OAM server provides the PCID reuse factor and the PCID allowable range (e.g., the PCID list) to the corresponding BS.

Figure 7:
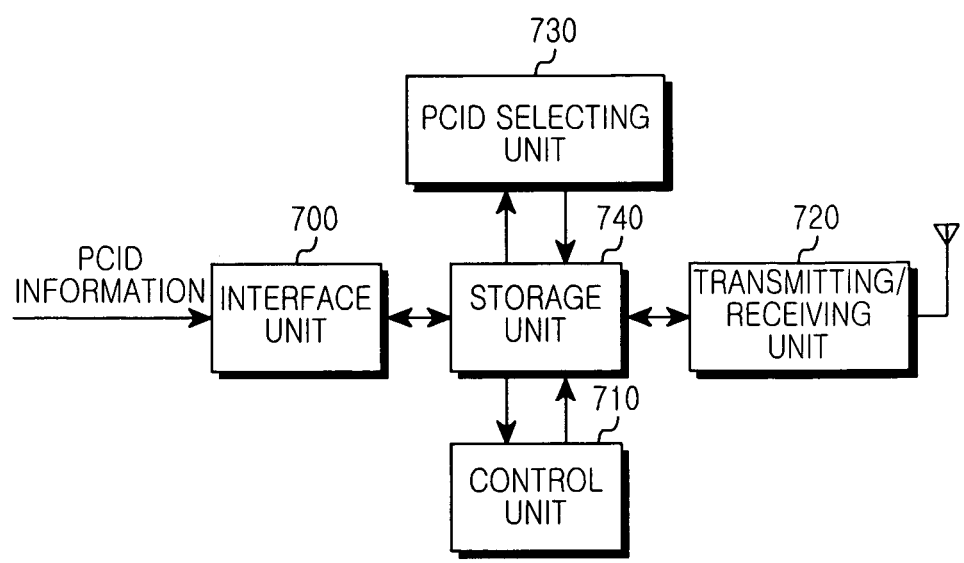
FIG. 7 illustrates an apparatus for PCID allocation in a wireless communication system according to an embodiment of the present invention.

FIG. 7 illustrates an apparatus for PCID allocation in a wireless communication system according to an embodiment of the present invention.

Referring to FIG. 7, a base station (BS) includes an interface unit 700, a control unit 710, a storage unit 740, a PCID selecting unit 730, and a transmitting/receiving unit 720.

The interface unit 700 provides a connection with a backbone network to receive information about a PCID reuse factor and a PCID allowable range (or a PCID list) from an OAM server. In an embodiment, the PCID reuse factor is determined by the OAM server in consideration of the cell coverage, the cell population density, the available PCID range, the allowable interference standard, and/or the propagation characteristics of an installed cell. Also, the interface unit 700 provides an X2 interface, acquires a Neighbor Cell List (NCL) from a neighbor BS, receives confusion-causing PCID information, and stores the same in the storage unit 740.

The control unit 710 controls an overall operation of the BS. In an embodiment, the control unit 710 controls the interface unit 700, the transmitting/receiving unit 720 and the storage unit 740 to collect a collision-causing PCID and a confusion-causing PCID. That is, the control unit 710 may use the measurement report of a user terminal or may estimate the received signal strength of the cell using each PCID to determine an interference-causing cell to determine collision-causing PCID information. Also, the BS may acquire a Neighbor Cell List (NCL) through an X2 interface with neighbor cells, thereby determining confusion-causing PCID information.

The PCID selecting unit 730 removes the collision-causing PCID from the PCID list and removes the confusion-causing PCID to determine a candidate PCID list. Thereafter, it selects a PCID in consideration of the PCID reuse factor. Herein, a PCID is selected as follows. A new cell acquires RSRP value information about candidate PCIDs included in the candidate PCID list and selects a PCID on the basis of Equation (1).

Figure 8:
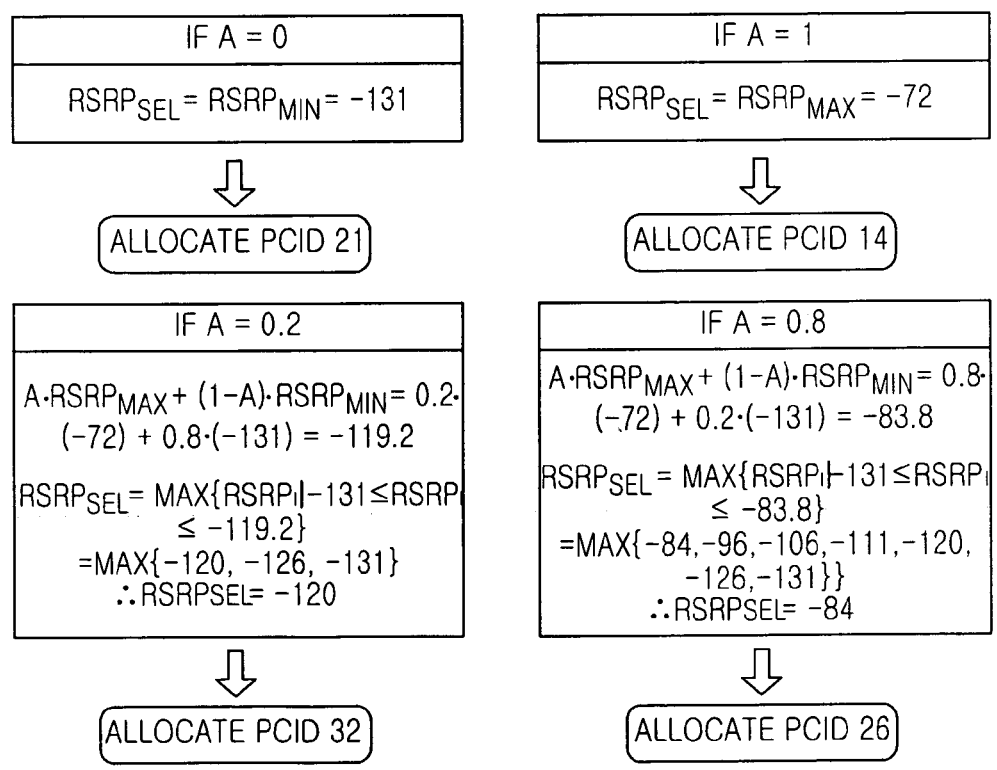
FIG. 8 illustrates an example of determining a PCID value in a candidate PCID list (5, 14, 17, 21, 26, 32, 33, 48) differently depending on a PCID reuse factor by using Equation (1) according to the present invention.

FIG. 8 illustrates an example of determining a PCID value in a candidate PCID list (5, 14, 17, 21, 26, 32, 33, 48) differently depending on a PCID reuse factor by using Equation (1) according to the present invention.

It is assumed that the RSRP of a cell using a candidate PCID 21 is '−131 dBm', the RSRP of a cell using a candidate PCID 17 is '−126 dBm', the RSRP of a cell using a candidate PCID 32 is '−120 dBm', the RSRP of a cell using a candidate PCID 48 is '411 dBm', the RSRP of a cell using a candidate PCID 5 is '−96 dBm', the RSRP of a cell using a candidate PCID 26 is '−84 dBm', the RSRP of a cell using a candidate PCID 33 is '−78 dBm', and the RSRP of a cell using a candidate PCID 14 is '−72 dBm'.

If the OAM server sets a PCID reuse factor $\alpha$ to '0', the BS selects the PCID 21 with the minimum RSRP value among the RSRP values of the candidate PCIDs. If the OAM server sets the PCID reuse factor $\alpha$ to '1', the BS selects the PCID 14 with the maximum RSRP value among the RSRP values of the candidate PCIDs. If the OAM server sets the PCID reuse factor $\alpha$ to '0.2', the OAM server selects the PCID 32 with the maximum RSRP value among the PCIDs 21, 17, and 31 satisfying the allowable interference. If the OAM server sets the PCID reuse factor $\alpha$ to '0.8', it selects the PCID 26 with the maximum RSRP value among the PCIDs 21, 17, 32, 48, 5 and 6 satisfying the allowable interference.

According to Equation (1), the PCID reuse factor may be used to control the allowable interference size. If the interference from the cell using the same PCID becomes higher than the threshold value of the received signal of a serving cell, it causes a performance degradation such as a packet error rate (PER) or signal-to-noise ratio (SNR) loss. The level of the interference causing the performance degradation such as the PER or SNR loss may differ according to the environments of a cell installation region. Also, if the standard of determining a neighbor cell causing the interference is set to be greater than the allowable interference size or the update of a Neighbor Cell List (NCL) is late, the PCID with the possibility of causing a collision may not be removed. Thus, when a suitable PCID reuse factor is selected in consideration of the standards of the allowable interference and the propagation characteristics of a cell installation environment, the PCID reuse efficiency may be increased without causing the performance degradation due to the interference.

Also, when the PCID reuse factor is used to increase the PCID reuse efficiency, PCIDs may be allocated to more cells by fewer PCIDs. In comparison with the conventional mobile communication environments, the LTE system environments are expected to use various cells (e.g., pico cells and femto cells) that support smaller coverage areas than the conventional macro cells.

As the cell coverage decreases, the number of cells necessary for providing a service to the same area may increase. Also, if the standard of determining a neighbor cell causing the interference is set to be smaller than the allowable interference size or the removal of an unnecessary cell becomes late in an NCL update process, the number of PCIDs removed from the available PCID list may increase because unnecessary neighbor cells are included in the NCL. This may cause a shortage of candidate PCIDs. Thus, an efficient PCID reuse scheme is necessary to allocate PCIDs to more cells. The scheme according to the present invention can be efficiently used for PCID allocation in the LTE system because it can control the PCID reuse frequency.

As described above, the present invention uses the PCID reuse factor to perform PCID allocation in the SON network, thereby making possible the efficient use of limited PCIDs. Also, the present invention can control the allowable interference size, the PCID reuse frequency, and the number of PCIDs necessary for PCID allocation to the same number of cells by controlling the PCI reuse factor.

Although the present disclosure has been described with various embodiments, changes and modifications may be suggested to one skilled in the art. It is intended that the present disclosure encompass such changes and modifications as fall within the scope of the appended claims.

What is claimed is:

1. A method for allocating a Physical Cell Identifier (PCID) in a wireless communication system, the method comprising:
acquiring an allowable PCID list from a server;
determining a set of candidate PCIDs from the allowable PCID list according to one or more PCID allocation conditions;
measuring a received signal strength of each cell using the determined set of candidate PCIDs; and
selecting at least one PCID by using a PCID reuse factor and the received signal strength of each of the cells using the determined set of candidate PCIDs,
wherein the PCID reuse factor is determined based on at least one of a cell population density, and propagation characteristics of each of the cells,
wherein selecting at least one PCID by using a PCID reuse factor and the received signal strength of each of the cells using the determined set of candidate PCIDs comprises:
as the PCID reuse factor increases selecting a PCID with more received signal received power (RSRP) value among the RSRP values for the all the candidate PCIDs.

2. The method of claim 1, further comprising acquiring the PCID reuse factor for controlling the PCID reuse efficiency and the inter-cell interference from the server.

3. The method of claim 1, wherein the PCID is selected by using the PCID reuse factor and the received signal strength of each of the cells using the determined candidate PCID, based on the following equation:

$$RSRP_{sel}=\text{Max}\{RSRP_i | RSRP_{min} \leq RSRP_i \leq \alpha RSRP_{Max}+(1-\alpha)RSRP_{Min}\} \text{ where } 0 \leq \alpha \leq 1,$$

$$RSRP_{Max} = \text{Max}\{RSRP_i | i \in I\}$$

$$RSRP_{Min} = \text{Min}\{RSRP_i | i \in I\}$$

wherein $\alpha$ denotes the PCID reuse factor, I denotes the set of candidate PCIDs included in a candidate PCID list, i denotes a PCID among the set of candidate PCIDs, $RSRP_i$ denotes a RSRP value received from a cell using a PCID i, $RSRP_{Max}$ denotes the maximum RSRP value among the RSRP values for all the candidate PCID i, and $RSRP_{Min}$ denotes the minimum RSRP value among the RSRP values for all the candidate PCID i.

4. The method of claim 1, wherein the PCID allocation conditions satisfy collision-free conditions and confusion-free conditions.

5. The method of claim 1, wherein the received signal strength is determined by the received power of a cell-specific downlink reference signal, and the sequence of the reference signal is determined by the PCID of each cell.

6. The method of claim 1, further comprising acquiring information about the PCID allocation conditions.

7. The method of claim 6, wherein acquiring the information about the PCID allocation conditions comprises at least one of:
determining PCID information of a cell for a possible handover of a user terminal based on a measurement report of the user terminal;
determining PCID information of a cell causing a possible interference by collecting received signal strengths from adjacent cells; and
determining PCID information included in a neighbor cell list acquired through an X2 interface with the neighbor cell.

8. The method of claim 1, wherein the wireless communication system comprises a self-organization network (SON) system.

9. An apparatus for allocating a Physical Cell Identifier (PCID) in a wireless communication system, the apparatus comprising:
a control unit configured to acquire an allowable PCID list from a server, and determine a set of candidate PCIDs from the allowable PCID list according to PCID allocation conditions;
a communications unit configured to measure a received signal strength of each cell using the determined set of candidate PCIDs; and
a PCID selecting unit configured to select at least one PCID by using a PCID reuse factor and the received signal strength of each of the cells using the determined set of candidate PCIDs,
wherein the PCID reuse factor is determined based on at least one of a cell population density, and propagation characteristics of each of the cells,
wherein as the PCID reuse factor increases, the PCID selecting unit is configured to select a PCID with more received signal received power (RSRP) value among the RSRP values for the all the candidate PCIDs.

10. The apparatus of claim 9, wherein the control unit is configured to acquire the PCID reuse factor for controlling the PCID reuse efficiency and the inter-cell interference from the server.

11. The apparatus of claim 9, wherein the PCID is configured to be selected by using the PCID reuse factor and the received signal strength of each of the cells using the determined candidate PCID, based on the following equation:

$$RSRP_{sel}=\text{Max}\{RSRP_i | RSRP_{Min} \leq RSRP_i \leq \alpha RSRP_{Max}+(1-\alpha)RSRP_{Min}\} \text{ where } 0 \leq \alpha \leq 1,$$

$$RSRP_{Max}=\text{Max}\{RSRP_i | i \in I\}$$

$$RSRP_{Min}=\text{Min}\{RSRP_i | i \in I\}$$

wherein $\alpha$ denotes the PCID reuse factor, I denotes the set of candidate PCIDs included in a candidate PCID list, i denotes a PCID among the set of candidate PCIDs, $RSRP_i$, denotes a RSRP value received from a cell using a PCID i, $RSRP_{Max}$ denotes the maximum RSRP value among the RSRP values for all the candidate PCID i, and $RSRP_{Min}$ denotes the minimum RSRP value among the RSRP values for all the candidate PCID i.

12. The apparatus of claim 9, wherein the PCID allocation conditions satisfy collision-free conditions and confusion-free conditions.

13. The apparatus of claim 9, wherein the received signal strength is configured to be determined by the received power of a cell-specific downlink reference signal, and the sequence of the reference signal is determined by the PCID of each cell.

14. The apparatus of claim 9, wherein the control unit is configured to acquire information about the PCID allocation conditions.

15. The apparatus of claim 9, wherein the control unit is configured to acquire the information about the PCID allocation conditions by at least one of:
- determining PCID information of a cell for a possible handover of a user terminal based on a measurement report of the user terminal;
- determining PCID information of a cell causing a possible interference, by collecting received signal strengths from adjacent cells; and
- determining PCID information included in a neighbor cell list acquired through an X2 interface with the neighbor cell.

16. The apparatus of claim 9, wherein the wireless communication system comprises a self-organization network (SON) system.

* * * * *